May 12, 1936.  G. A. JOHNSON  2,040,438
ARMORED BARE GROUND WIRE
Filed May 2, 1933
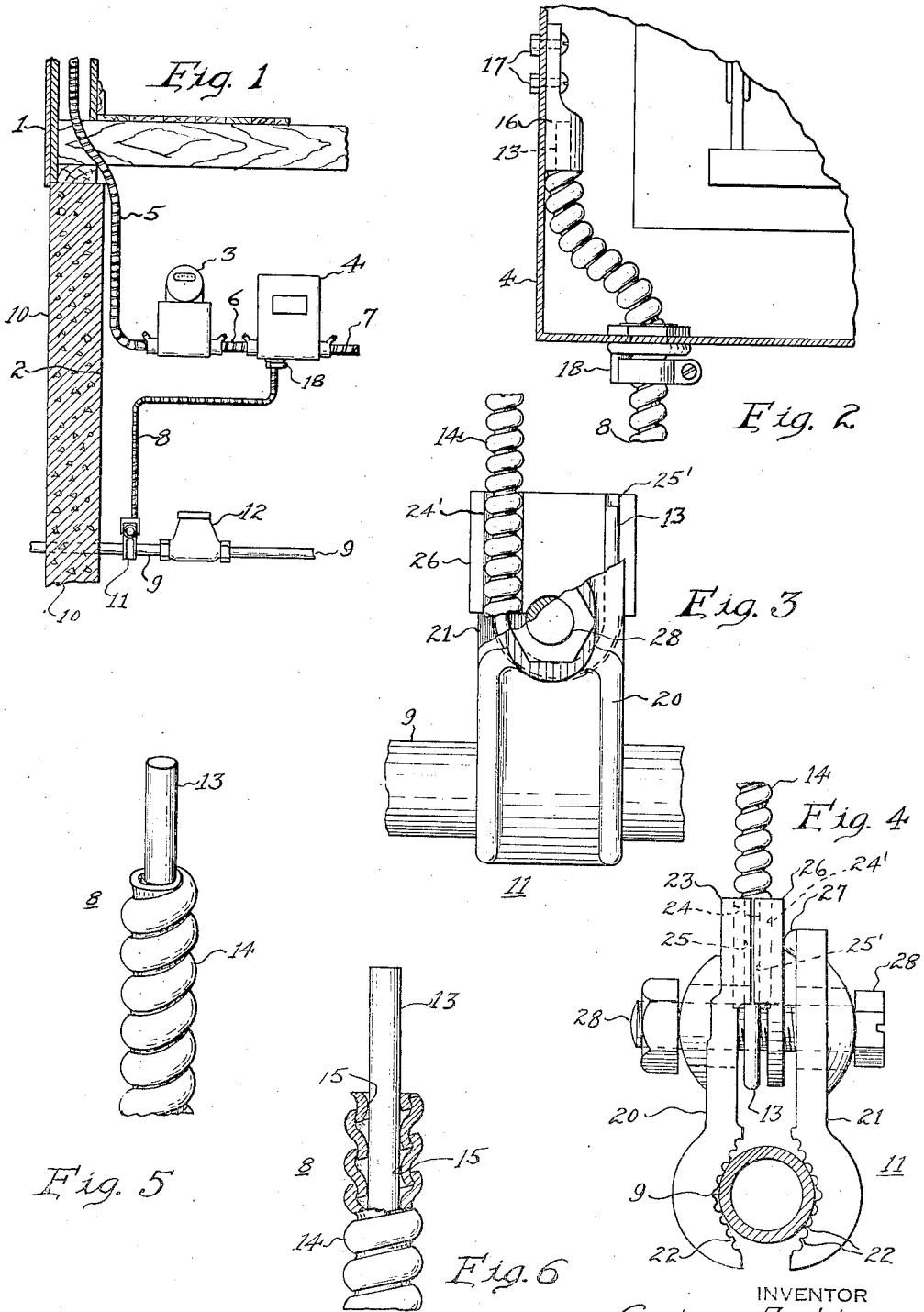
INVENTOR
Gustave A. Johnson
BY
ATTORNEY Patented May 12, 1936

2,040,438

UNITED STATES PATENT OFFICE 2,040,438

ARMORED BARE GROUND WIRE

Gustave A. Johnson, Newark, N. J., assignor to Electrical Patent Holding Corporation, New York, N. Y., a corporation of New York Application May 2, 1933, Serial No. 668,909

1 Claim. (Cl. 173—13)

This invention relates generally to ground connections or ground wires adapted to be connected to a switch box or other part of electrical wiring circuits, such as those employed in residences, office buildings, and the like; and the invention has reference, more particularly, to a novel armored bare ground wire especially adapted for the above purpose.

Heretofore, in grounding the switch box or other part of the wiring circuit of residences, office buildings, and other structures, it has been common to employ rigid conduit or piping which is installed so as to extend from the switch box or other part to the water supply pipe at the outer side of the water meter. After installing the rigid conduit or pipe, an insulated copper wire or wires are pulled through the said conduit, such wire or group of wires having one end electrically connected to the switch box casing and the other end thereof electrically connected to the water supply pipe. In this way a suitable ground is provided for the switch box, but at a relatively great expense, inasmuch as the installation of the rigid conduit and of the insulated wires therein involve considerable material and labor costs.

The principal object of the present invention is to provide a novel armored bare ground wire of simple construction and relatively cheap in cost, which armored bare ground wire is adapted to be easily and quickly installed for grounding the switch box or other part of an electrical circuit upon the water supply pipe, thereby greatly simplifying and cheapening this installation of ground connections.

Another object of the present invention lies in the provision of a novel armored bare ground wire comprising, a bare electrical conducting wire having a spiral armor closely wrapped thereabout, the said armor not only serving to protect and stiffen the wire against external forces but also enhancing the electrical conductivity of the wire.

Still another object of the present invention is to provide a novel completely assembled armored bare ground wire of simple character ready for installation, together with suitable means for grounding one end thereof upon the switch box or other part and for grounding the other end thereof upon the water supply pipe or other grounded member.

Other objects of this invention, not at this time more particularly enumerated, will be clearly understood from the following detailed description of the same.

The invention is clearly illustrated in the accompanying drawing, in which:—

Fig. 1 is a fragmentary diagrammatic view illustrating the use of the novel armored bare ground wire of the present invention.

Fig. 2 is an enlarged fragmentary view with parts broken away of a portion of the structure shown in Fig. 1;

Fig. 3 is an enlarged fragmentary view with parts broken away of another portion of the structure shown in Fig. 1;

Fig. 4 is a view in side elevation of the structure shown in Fig. 3;

Fig. 5 is a perspective fragmentary view of a piece of the armored bare ground wire, and Fig. 6 is a fragmentary view with parts broken away of the ground wire shown in Fig. 5.

Similar characters of reference are employed in said views, to indicate corresponding parts.

Referring now to the several views of the said drawing, the reference numeral 1 designates a building structure, such as a house, having a basement or cellar 2 in which is mounted an electric meter 3 and a switch box 4. Armored cable 5 is shown as connected at its lower end to the meter 3, the said armored cable being connected at its upper end to the usual outside source of current supply (not shown). Additional armored cable 6 connects the meter 3 to the switch box 4, which in turn is connected by armored cable 7 in the usual manner to the various convenience outlets, lighting fixtures and other electrical devices (not shown) situated throughout the house. The switch box 4 is illustrated as electrically connected by the novel armored bare ground wire 8 of the present invention to water supply piping 9 that extends inwardly through the foundation wall 10 of the house. A clamp designated as a whole by the reference numeral 11 is employed for connecting the end portion of the armored bare ground wire 8 to the water supply piping 9 at a point ahead of the water meter 12.

The novel armored bare ground wire 8, as especially shown in Figs. 5 and 6, comprises a single interior conducting wire 13 which is preferably of copper and is illustrated as of circular cross section. The wire or conductor 13 is preferably of relatively heavy gage, for example, for most residences the same may be of a diameter corresponding to No. 8 American wire gage and consequently has a relatively large current carrying capacity. The single electrical conductor 13 is encircled and protected by a metallic flexible armor 14. The metallic armor 14 comprises a metallic strip of approximately S-shape in cross section (see Fig. 6) and is wound helically upon the wire 13 with the convolutions of the metallic strip interlocked one with another, but disposed so as to allow a reasonable degree of flexing or bending whereby the completed armored bare ground wire 8 may be conveniently bent around corners or into desired shape, as illustrated in Fig. 1.

Substantially one-half of the S-shaped cross section of the strip forming the metallic armor 14 projects radially inwardly of the mean diameter of the convolutions of the armor, thereby forming an inner continuous helical bead 15 having a convex inner face and a concave outer face. The other half of the S-shape cross section of the metallic armor 14 projects outwardly and has a convex outer surface, as especially shown in Fig. 6. The marginal edge portion of this outwardly projecting half of any one convolution of the armor overlies and engages the outer edge portion of the inwardly projecting half of the adjoining convolution of the armor. The convex outer portion of one convolution thus engages the concave inner portion of the next succeeding convolution to thereby form an interlocked helical wrapping completely surrounding the conductor 13.

The pressure used for setting the metallic armor in place upon the conductor 13 is such as to also cause the inner spiral bead 15 to press against the conductor 13 along a continuous helical line, whereby a continuous line of contact is formed between the conductor 13 and the armor 14, thereby providing a relatively strong composite structure adapted to adequately withstand external blows or other injurious forces, and at the same time the electrical conductivity of the conductor 13 is enhanced by the presence of the armor 14. The presence of the armor 14 in effect greatly increases the moment of inertia of the area of the conductor 13 so that the strength of this conductor is greatly enhanced and hence will not break when subjected to relatively heavy blows, while at the same time the bending of the armored wire to the desired form when installing the same is made relatively easy.

In installing the armored bare ground wire, a few turns of the armor 14 is removed from the ends of the armored wire, thereby exposing the end portions of the conductor or wire 13. One end portion of the conductor is inserted through a hole provided therefor in the switch box 4, or other part to be grounded, and a clip or clamp 16 is preferably soldered to the end of the conductor 13. Clip 16 is then secured as by bolts 17 to the wall of box 4, thereby grounding the wire or lead 13 on this box. A coupling or connecting device 18 is shown as employed for attaching the armored wire to the switch box at the point where the armored wire enters this box.

The other end portion of the conductor 13 extends into the clamp 11 to be held by the latter. This clamp is shown as consisting of opposed clamp brackets 20 and 21 having their lower portions outwardly bowed for receiving the pipe 9 therebetween, the lower inner surfaces of these clamp brackets being knurled at 22 for gripping the pipe. The upper portion of clamp bracket 20 is formed to provide a clamp shoe 23 having vertical semi-cylindrical grooves 24 and 25 on its inner surface for receiving end portions of the armor 14 and conductor 13, respectively. A separable clamp shoe 26 is interposed between clamp shoe 23 and a boss 27 formed on the upper portion of clamp bracket 21. Clamp shoe 26 also has semi-cylindrical grooves 24' and 25' disposed opposite grooves 24 and 25, respectively, for cooperating with the latter grooves in holding the end portions of the armor 14 and conductor 13. A bolt 28 extends through aligned apertures in the clamp brackets 20 and 21 and in the clamp shoe 26 for binding these parts together, thereby causing the clamp to firmly grip the pipe 9 and the end portion of the armored bare ground wire. It will be noted that the end portion of conductor 13 is bent so as to extend under bolt 28 and up between the opposed grooves 25 and 25' to be gripped by the latter. The clamp 11 by gripping both the armor 14 and the wire 13 serves to securely attach the armored bare ground wire to the pipe 9, thereby providing an excellent ground upon this pipe.

As many changes could be made in the above construction and many apparently widely different embodiments of this invention could be made without departing from the scope thereof, as defined by the following claim, it is intended that all matter contained in the above description or shown in the accompanying drawing shall be interpreted as illustrative and not in a limiting sense.

I claim:—

A ground wire for grounding a part of an electrical wiring circuit upon a grounded member comprising, a bare electrical conducting wire and a metallic armor strip of approximately S-shaped cross section wrapped helically and tightly upon said conducting wire to form a flexible protective metallic armor for said conducting wire, said armor consisting of successive convolutions of said armor strip, each of which convolutions has an outwardly projecting portion and an inwardly projecting portion, the outwardly projecting portion of one convolution being disposed to partly overlie the inwardly projecting portion of an adjoining convolution in interlocking relation, said inwardly projecting portions of said successive convolutions providing a continuous helical bead for firmly gripping said conducting wire along a helical line, thereby forming a substantially unitary structure of relatively great strength and resistance to injury.

GUSTAVE A. JOHNSON.